Nov. 4, 1952   W. F. LE FEVRE, JR   2,616,683
MECHANISM FOR WEIGHING BULK CARGO
Filed March 17, 1947   2 SHEETS—SHEET 1

Inventor
William F. Le Fevre Jr.
By
Reynolds & Beach
Attorneys

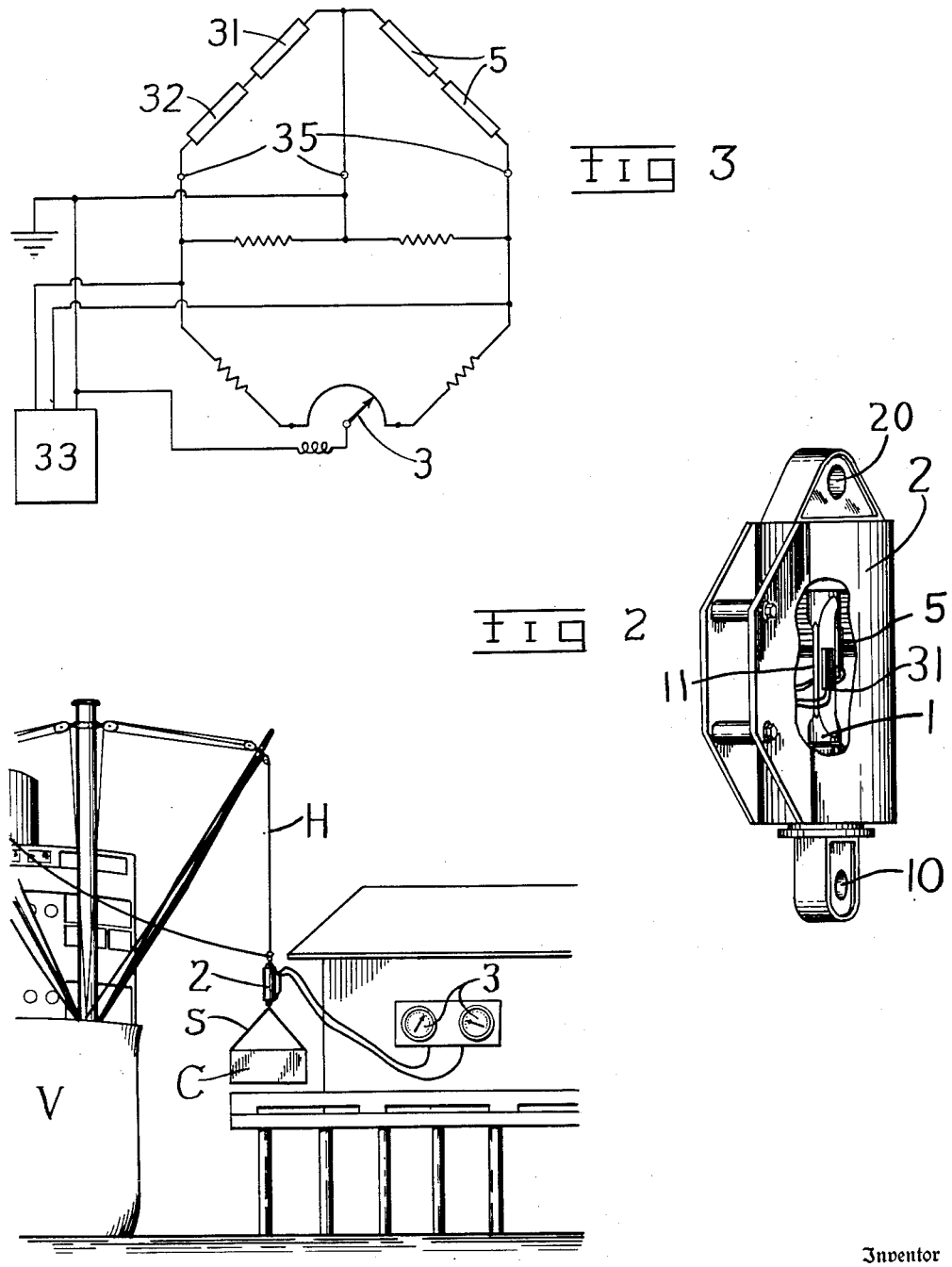

Patented Nov. 4, 1952

2,616,683

UNITED STATES PATENT OFFICE 2,616,683

MECHANISM FOR WEIGHING BULK CARGO

William F. Le Fevre, Jr., Seattle, Wash., assignor to Griffiths & Sprague Stevedoring Co., Seattle, Wash., a corporation of Washington Application March 17, 1947, Serial No. 735,218

3 Claims. (Cl. 265—27)

Bulk cargo, such as grain, which must be handled by scoops or buckets, is difficult to weigh accurately, for each individual load varies in weight. Any calculation which consists in averaging the weight of loads, and multiplying by the number of loads, is subject to manifest errors, rather sizable in the aggregate if the number of loads is large, as usually it is in the handling of such cargo in bulk. Nor is it possible to take the time, even were suitable weighing mechanism available, to rest each individual load upon a scale or the like, in order to ascertain its exact weight.

The primary object of the present invention is to provide weighing mechanism, particularly suited for use with bulk cargo but equally well adapted for use in handling any cargo, by means of which each load can be accurately measured during, and without interruption to, the hoisting and handling thereof, so that the weighing of the entire cargo becomes simply the addition of the weights of the many individual loads. In this connection, the individual load weights can be read in any units of weight desired, and without inclusion of tare, except to the extent that the tare weight is inseparable from the cargo weight, as when the cargo is enclosed within shipping cases, etc.

In the particular form of mechanism chosen for carrying out this invention, wherein a rod centrally reduced in cross-section is subject to elongation of appreciable or measurable amount, in proportion to the load supported thereby, it is substantially impossible to prevent such rod from bending or otherwise warping under no-load conditions. Such warping introduces a factor of inaccuracy, and it is therefore desirable to provide compensation automatically or otherwise, for inaccuracy from this cause, should any exist.

Since the weighing mechanism of this invention includes a device intended to be interposed physically between the hoist line and the load being hoisted, and depends for its operation upon the deformation, as by elongation, of a load-supporting member incorporated in that device, there is always present the possibility that the elongatable member may be excessively elongated, beyond its elastic limit or yield point, and so weakened to the breaking point. In order that such excessive elongation may be prevented, or that its results may be minimized should it occur nevertheless (thus, in order that the load may not be dropped in the event of breakage, to the peril of persons and gear therebelow, and with possible loss of the load), a still further object of the invention is so to design the weighing mechanism that the load is still supported by supplemental means if the elongation of the elongatable member tends to become excessive, which supplemental means become safety means in the event of breakage, and the load, by such means, can be handled and lowered safely in either such event. Moreover, resilient supporting means are provided in addition, and to the end that the possibility of breakage or deformation from shock loads may be minimized, yet without altering the accuracy of indication with the strain gage means.

It is also an object of the present invention to provide weighing mechanism of the general character and for the general purposes indicated, which shall be simple, inexpensive, rugged, and reliable; in particular, it is an object to provide such weighing mechanism which may be used satisfactorily in the regular handling of marine cargo, and which, in the event the weighing of some particular cargo is not necessary, may be left in place without interfering with the normal use of the hoisting gear, thus eliminating any necessity of setting up the gear especially for the weighing of cargo, or of disassembling the gear when weighing is unnecessary.

With such objects in mind, and others as well appear as this specification progresses, the present invention comprises the novel parts and combination and arrangement of parts, both mechanically and electrically, as is shown in the accompanying drawing in a typical arrangement, and as will be more particularly described in this specification and pointed out in the claims which conclude the same.

Figure 2 is a side elevation of the same, with parts broken away.

Figure 3 is an electrical diagram of the entire device, mechanical parts being omitted.

Figure 4 is in the nature of a pictorial view, illustrating the manner of using the device.

Figure 1:
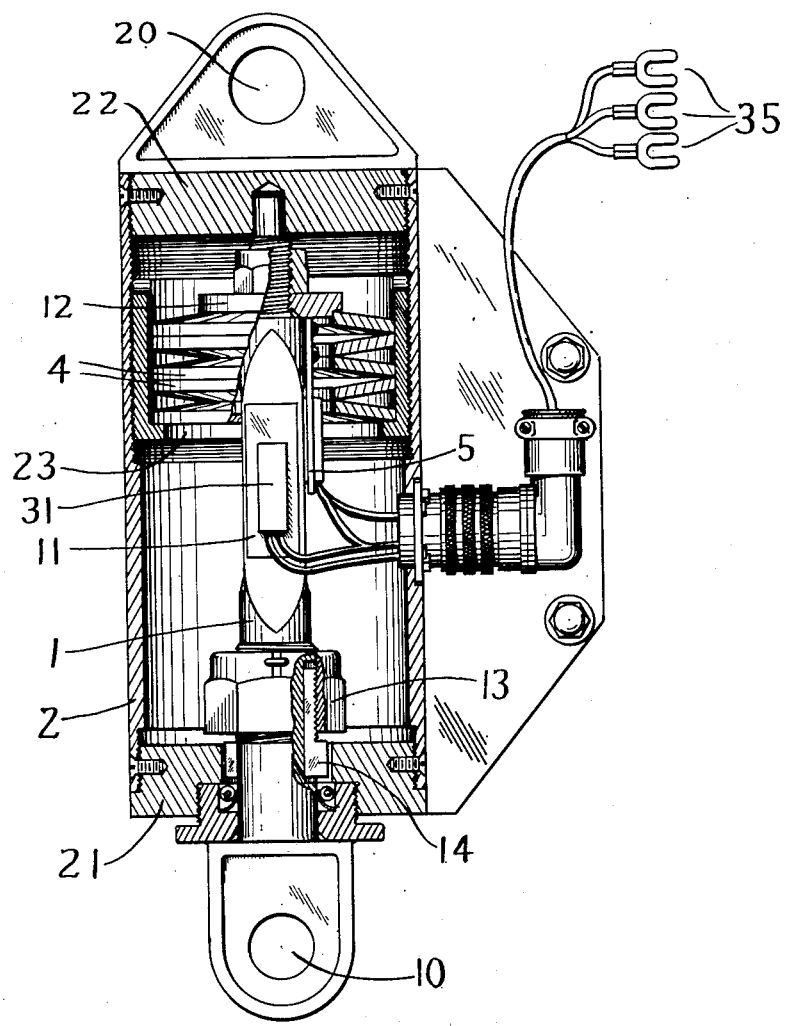
Figure 1 is a general axial section through the weighing mechanism, other than the indicating means.

While the cargo C being handled between the vessel V and the adjacent wharf W, in Figure 4, is in the nature of a shipping case, supported in a conventional sling S, this may be taken as representative of any sort of cargo, including particularly bulk cargo in a scoop or bucket, such as is loaded or unloaded by a hoist line H. The weighing device of the present invention is interposed between the hoist line H and the load C, so as to become, in effect, an integral part of the load-supporting gear; it is represented, in Figure 4, by the housing 2. Indicating means are provided, separate from the weighing device, located at any convenient location, for instance upon the wharf, as indicated in Figure 4. While operatively an indicating means is an essential part of weighing apparatus employing the present invention the precise form of the indicating means is quite immaterial, so long as it be capable of operation by or in conjunction with the mechanism within the housing 2. It will be described in some detail hereinafter.

The housing 2 is one of two load-supporting members; it is formed at one end with the eye 20 for connection to the fall block, or for other convenient connection in the hoisting gear. Within the housing, and supported therefrom, is a rod 1 which represents the other of the two load-supporting members; it is similarly formed at one end with an eye at 10 for connection in the hoisting gear. The rod 1 is formed with a transiently deformable central portion 11, its deformation being by elongation produced by making it of reduced cross-section, the size whereof is calculated to support loads within a predetermined range, and to elongate by predetermined amounts with each added increment of the load. Naturally, by proper choice of the cross-sectional size and shape, and of the material and its conditioning, a rod such as this can be selected to handle and to elongate under loads throughout any desired range.

For convenience of description the eye 20 may be considered to be disposed uppermost, and the eye 10 lowermost; that relationship, however, may as readily be reversed, and the device will function as well in either position.

The housing 2 is provided with heads 21 and 22 closing its lower and upper ends, respectively. These heads are shown as securely screwed within the housing, and as locked in such relationship, for the entire load, and perhaps an overload, is imposed normally upon the upper head 22, and any overload may be imposed, possibly suddenly, with some impact, upon the lower head 21. The rod 1, including its upper end and its reduced portion 11, is enclosed within the housing 2, leaving only the lower end protruding, carrying the eye 10. Also securely mounted within the housing 2, and directed inwardly towards the upper end of the rod 1, is a ledge 23; this ledge normally supports the entire load, hence must be strongly secured to the housing.

The upper end of the rod 1, above its reduced portion 11, has secured to it a collar 12, which cooperates normally with the ledge 23 in the support of the load. Below the reduced portion 11 the rod 1 carries a collar 13. Interposed between the collar 12 and the ledge 23, and hence resiliently supporting all loads at all times under all normal conditions, are Belleville springs 4, although other types of springs may be used depending upon the amount of load to be supported, which have such resilient load-deflection characteristics as to permit the rod 1 and collar 13 to move axially when excessively large loads are applied, and, in the extreme, allowing the collar 13 to contact the head 21. In this manner the springs absorb shock loads, while loads over and above those which, even with the cushioning of the springs, can be supported by the reduced section 11 of rod 1, or which cause appreciable permanent elongation or breakage thereof, are transmitted from the rod, to the collar 13, through the head 21, thence into the housing 2 and out from the head 22 into the hoisting line. Thus, the collar 13 and head 21, being normally held apart by the springs 4, constitute normally inoperative but always ready safety means, and damage to the reduced section of rod 1 and breakage of said rod from excessive stress is prevented. Further, should failure (excessive permanent elongation or rupture) occur in the rod above the collar 13, the load can be supported without danger from the housing 2 to the eye 10. At no time during normal use is it intended that the collar 13 shall contact the head 21. The deflection of the springs 4 under load is not depended upon to measure, nor does it effect the measure of the load; it is the resilient deflection or elongation of the reduced portion 11 which is the load-measuring factor. In order to prevent relative rotation between the rod 1 and the housing 2, such as would produce unforeseen stresses to disturb the accuracy of the readings, a key 14 projects from the lower end of the rod, into a keyway extending axially of the head 21.

The primary strain gauge 31 may be of any known type; it may be assumed that the one shown, and others to be described, are of the resistance type, wherein their electrical resistance varies directly in accordance with elongation. They may be equally well be of the magnetic type, or of any other known type, and their particular form is unimportant. This strain gauge 31 is intimately connected with the reduced portion 11 of the rod, in such manner, known to the art of strain gauges, that any elongation of the reduced portion 11 will cause corresponding elongation of the strain gauge 31. Such a strain gauge is connected, in manner largely conventional in strain gauges, to an indicating means. The strain gauge 31 may, for example, be incorporated electrically in a Wheatstone bridge, such as in the patent to Moore, No. 2,414,161, January 14, 1947, and when strain unbalances the gauge 31, an indicator 3—33 is actuated to determine such unbalance. The indicator 3 may for instance, represent a dial associated with a variable resistor which is adjusted upon application of load to the strain gauge to rebalance a Wheatstone bridge circuit, the null or balance condition being found by reference to a zero-reference or null-finding meter 33. This electrical technique is very common and is representative of numerous ways of determining the electrical change in a strain gauge under load. It represents no part of the invention presently being claimed. The weight attributable to any part of the weighing device and sling can be cancelled out, so that the indicator 3—33 will give a tareless indication.

A temperature compensating element 5 is mounted in the vicinity of the reduced portion 11 of the rod, where it is affected by identical temperature conditions, but it is not physically connected for elongation by the rod; rather it elongates within its own length by temperature increase. Electrically, it is (or they are) or may be incorporated in the arm of the Wheatstone bridge, again as in the Moore patent, cited above, for example.

But other disturbing factors have been encountered in the actual operation of the device. The rod 1 is usually heat-treated to increase the proportional limit of stress of the material after reducing the cross-section at 11. Such heat treating almost invariably leaves the rod slightly bent, or otherwise warped, and by amounts which are unpredictable in individual rods, and which hence can not be accurately compensated for in the design. Such a rod which is bent or concaved, let us say, to the right, will tend to extend more on its right side, as it elongates under load, than would a straight rod, and in the same manner it may tend initially to compress rather than expand, on its convex left side. These variations from theoretical perfection are microscopic, but nevertheless important where total changes are so slight. If the primary strain gauge happens to be located upon the concave right side, upon application of a load it will indicate a greater load than it is actually subjected to, whereas if it happens to be located upon the left side, it may even initially indicate a minus load, and will always indicate a lesser load than the load actually imposed upon it.

In order to compensate, preferably automatically, for such a disturbing factor, a secondary strain gauge is provided, or in effect the one strain gauge is divided, and the two parts are applied, one to the concave side and the other to the convex side, of the reduced portion of the rod. It is not necessary to discover which is the convex or the concave side, for in practice the primary strain gauge 31 is applied to one side of the portion 11, and the secondary strain gauge 32 is applied to the opposite side thereof. Electrically, the two strain gauges 31 and 32 are connected in series in the same arm of the Wheatstone bridge, again as in the Moore patent cited above, balanced against the arm which incorporates the thermal elements or elements 5, assuming that thermal compensation is provided. Now it is clear that if the element 31 tends to expand unduly, due to straightening out of a warped rod, the other element 32 will contract, or vice versa. Each counteracts the error of the other, and the algebraic sum of the two is always equivalent to the correct reading obtainable were the rod precisely straight.

In the electric diagram of Figure 3, the Wheatstone bridge circuit is old, and needs no explanation. Variable resistances as needed are incorporated, in order to permit balancing, or changing the point of balance, of the bridge. At 33 may be incorporated amplifying devices, also as is well-known in the electronic art, in order to obtain such amplitude of movement of the indicating device, or such movement in opposition to resistance, as conditions of use may require.

The portion of the device which is associated physically with the housing 2 is rugged and durable, and can be incorporated as a permament part of the hoist gear. Should its use be not required in any particular job, its presence is not harmful. It is safe against failure within itself. It can be disconnected electrically, at 35, from the indicating device 3, whenever that is desirable. It provides a ready means whereby a checker can read directly the accurate, tareless weight of each load, and can thus determine the precise weight of the entire cargo by simple addition of the individual readings.

I claim as my invention:

1. Mechanism for weighing bulk cargo and the like, comprising a rod having a central portion of reduced cross-section elongatable under tension, a housing enclosing one end and the reduced central portion of the rod, the other end of the rod protruding from the housing, the housing and the protruding end of the rod respectively having means for securement to a load and to a load hoisting means, a ledge inwardly directed from the housing towards the rod, means supporting the enclosed end of the rod from said ledge, and yieldable under the influence of tension loads applied between the two securement means, which loads serve also to elongate the reduced portion of the rod, a head upon the protruding end of the rod, but within the housing, a complemental head inwardly directed from the housing towards the rod and spaced axially of said head upon the rod sufficiently to avoid contact therewith under all normal operating conditions, but disposed to intercept and support the rod through its head upon excessive elongation or breakage of the rod, and means for operative connection with the rod to indicate the degree of its elongation under load.

2. Weighing mechanism as in claim 1, including guide means interengageable between the rod and the housing's head, permitting relative axial movement but preventing relative rotational movement.

3. Mechanism for weighing bulk cargo and the like, comprising a rod having a reduced portion intermediate at its ends which is elongatable under load, and formed, at a first end, for direct connection to a load, a housing formed at one end for direct connection to a load, and apertured at its other end for receiving the second end and the reduced portion of said rod, spring means reacting between the inner wall of said housing and the second end of said rod, to retain the rod and the housing in definite position relationship under no-load conditions, and to transmit all loads under all normal conditions between them, and thereby to effect their departure from such definite position relationship, a strain gauge operatively connected to said elongatable portion of the rod, for operative connection to an indicator to indicate the extent of elongation under load, and cooperating safety means including an enlargement formed on the first end of the rod inside the housing and a cooperable inwardly projecting shoulder within the housing, respectively, and so located as to be maintained by said spring means in spaced-apart relation during all times that the rod and the housing are in relative positions corresponding to no-load or normal load conditions, but to be moved lengthwise into operative engagement upon elongation or lengthwise movement of the rod, such as would occur under excessive load conditions, by such engagement to limit such elongation and to prevent withdrawal of the rod from the housing in the event of breakage of the rod.

WILLIAM F. LE FEVRE, Jr.

REFERENCES CITED

The following references are of record in the file of this patent:

UNITED STATES PATENTS

| Number | Name | Date |
|---|---|---|
| 842,339 | Russo | Jan. 29, 1907 |
| 1,650,789 | Doolittle | Nov. 29, 1927 |
| 1,859,814 | Wyckoff | May 24, 1932 |
| 2,005,889 | Dillon | June 25, 1935 |
| 2,032,378 | Rice | Mar. 3, 1936 |
| 2,344,642 | Ruge | Mar. 21, 1944 |
| 2,414,161 | Moore | Jan. 14, 1947 |
| 2,421,222 | Schaevitz | May 27, 1947 |